US006594612B2

United States Patent
Moch (10) Patent No.: US 6,594,612 B2
(45) Date of Patent: Jul. 15, 2003

(54) MEASUREMENT SYSTEM HAVING AN IMPROVED SCAN LIST CONFIGURATION

(75) Inventor: Andrew Moch, Austin, TX (US)

(73) Assignee: National Instruments Corporation, Austin, TX (US)

(*) Notice: Subject to any disclaimer, the term of this patent is extended or adjusted under 35 U.S.C. 154(b) by 158 days.

(21) Appl. No.: 09/735,234

(22) Filed: Dec. 11, 2000

(65) Prior Publication Data

US 2002/0111753 A1 Aug. 15, 2002

(51) Int. Cl.[7] .............................................. G06F 19/00
(52) U.S. Cl. ...................... 702/123; 702/104; 702/176; 702/189; 341/110; 341/126; 341/144; 341/155; 710/5; 710/8; 710/20; 710/29; 710/36; 369/47.2; 369/47.35; 369/60.01; 370/229; 370/252
(58) Field of Search ................................. 702/104, 116, 702/117, 121–123, 126, 127, 176, 189, 190, 194, 199, FOR 103, FOR 104, FOR 154, FOR 156, FOR 157, FOR 160, FOR 164, FOR 167, FOR 169–171; 341/110, 126, 144, 155–156, 158–159, 162, 165, 166, 200; 369/47.2, 47.23, 47.24, 47.28, 47.32, 60.01; 370/229, 230, 232, 234, 252, 429; 710/5, 8–9, 13–15, 20–23, 25, 29, 36, 37

(56) References Cited

U.S. PATENT DOCUMENTS 6,201,492 B1 * 3/2001 Amar et al. ................. 341/155

OTHER PUBLICATIONS

Dehkordi et al., 'Performance Comparison of MCM–D and SMT Packaging Technologies for a DSP Subsystem' Jan. 1996, 96, pp. 245–248.*

Williamson et al., Characterization of a 16 bit Digitizer for Lidar Data Acquisition, Feb. 2000, NASA, vol.:2000–209860, pp. 1–11.*

Burxton Corporation, Data Acquisition: An Introduction, Mar. 13, 1998, Burxton Corp., pp. 1–7.*

National Instruments "DAQ—AT–M10 E Series Register–Level Programmer Manual", Aug. 1998 Edition.

* cited by examiner

Primary Examiner—Marc S. Hoff
Assistant Examiner—Elias Desta
(74) Attorney, Agent, or Firm—Meyertons Hood Kivlin Kowert & Goetzel, P.C.; Jeffrey C Hood (57) ABSTRACT

A digitizer for use in a measurement system. The digitizer acquires data from an external source, and includes a static random access memory (SRAM) which stores a scan list comprising entries specifying digitizer operations such as switch time, settle time, measure time, looping, and mathematical operation specifications such as scaling, adding, and averaging specifications. The looping specification may include instructions to repeatedly execute one or more entries in the scan list. The digitizer includes a programmable logic element (e.g. an FPGA) coupled to the SRAM which accesses and executes the scan list to acquire analog signals from the source. The digitizer may include an analog-to-digital converter to convert the analog signals to digital signals, as well as a multiplexer to read the analog signals from multiple channels, a signal conditioner to modify the analog signals from the multiplexer, and an amplifier to amplify the analog signals from the signal conditioner.

25 Claims, 8 Drawing Sheets

Scan – A series of measurements made repeatedly at a fixed time interval.

Scan List Format

0 – CHANNEL
602

| 7 | 6 | 5 | 4 | 3 | 2 | 1 | 0 |
|---|---|---|---|---|---|---|---|
| RFU | RFU | Chan(5) | Chan(4) | Chan(3) | Chan(2) | Chan(1) | Chan(0) |

1 – MODE
604

| 7 | 6 | 5 | 4 | 3 | 2 | 1 | 0 |
|---|---|---|---|---|---|---|---|
| RFU | ADD/SUB | Mode(5) | Mode(4) | Mode(3) | Mode(2) | Mode(1) | Mode(0) |

2 – RANGE
606

| 7 | 6 | 5 | 4 | 3 | 2 | 1 | 0 |
|---|---|---|---|---|---|---|---|
| RFU | RFU | RFU | RFU | RANGE(3) | RANGE(2) | RANGE(1) | RANGE(0) |

3 – CTL
608

| 7 | 6 | 5 | 4 | 3 | 2 | 1 | 0 |
|---|---|---|---|---|---|---|---|
| STORE | RECALL OFFSET | ACCUM | JUMP | GHOST | VMC | SA | RETRAN |

4 – TIMEBASE
610

| 7 | 6 | 5 | 4 | 3 | 2 | 1 | 0 |
|---|---|---|---|---|---|---|---|
| RFU | RFU | Switch TB(1) | Switch TB(0) | Settle TB(1) | Settle TB(0) | Measure TB(1) | Measure TB(0) |

| | |
|---|---|
| 612 | 5 – TRIG HIGH LEVEL – 8 Bit |
| 614 | 6 – TRIG LOW LEVEL – 8 Bit |
| 616 | 7 – SWITCHING TIME – 8 Bit |
| 618 | 8 – SETTLING TIME – 8 Bit |
| 620 | 9 – MEASURING TIME – 8 Bit |
| 622 | 10 – SHIFT – 8 Bit |
| 624 | 11,12,13 – GAIN_ERROR – 24 Bit |
| 626 | 14,15 – OFFSET – 16 Bit |
| 628 | 16,17 – REPEAT COUNTER – 16 Bit |
| 630 | 18,19 – JUMP PTR – 16 Bit |

MEASUREMENT SYSTEM HAVING AN IMPROVED SCAN LIST CONFIGURATION

BACKGROUND OF THE INVENTION

1. Field of the Invention

This invention relates to measurement and data acquisition systems, and, more particularly, to a scan list format for specifying measurement and data acquisition operations.

2. Description of the Relevant Art

Scientists and engineers often use measurement systems to perform a variety of functions, including measurement of a physical phenomena or unit under test (UUT), test and analysis of physical phenomena, process monitoring and control, control of mechanical or electrical machinery, data logging, laboratory research, and analytical chemistry, to name a few examples.

A typical measurement system comprises a computer system with a measurement device or measurement hardware. The measurement device may be a computer-based instrument, a data acquisition device or board, a programmable logic device (PLD), an actuator, or other type of device for acquiring or generating data. The measurement device may be a card or board plugged into one of the I/O slots of the computer system, or a card or board plugged into a chassis, or an external device. For example, in a common measurement system configuration, the measurement hardware is coupled to the computer system via other means such as through a VXI (VME extensions for Instrumentation) bus, a PXI (PCI extensions for Instrumentation) bus, a GPIB (General Purpose Interface Bus), a serial port, parallel port, or Ethernet port of the computer system. Optionally, the measurement system includes signal conditioning devices which receive the field signals and condition the signals to be acquired.

A measurement system may also typically include transducers, sensors, actuators or other detecting (or generating) means for providing "field" electrical signals representing a process, physical phenomena, equipment being monitored or measured, etc. The field signals are provided to the measurement hardware.

The measurement hardware may be configured and controlled by measurement software executing on the computer system. The measurement software for configuring and controlling the measurement system typically comprises two portions: the device interface or driver level software, and the application software or application. The driver level software serves to interface the measurement hardware to the application. The driver level software may be supplied by the manufacturer of the measurement hardware or by some other third party software vendor. An example of measurement or DAQ driver level software is NI-DAQ from National Instruments Corporation. The application or client is typically developed by the user of the measurement system and is tailored to the particular function which the user intends the measurement system to perform. The measurement hardware manufacturer or third party software vendor sometimes supplies the application software for certain applications which are common, generic or straightforward.

Measurement systems, which may also be generally referred to as data acquisition systems, may include the process of converting a physical phenomenon (such as temperature or pressure) into an electrical signal and measuring the signal in order to extract information. PC-based measurement and data acquisition (DAQ) systems and plug-in boards are used in a wide range of applications in the laboratory, in the field, and on the manufacturing plant floor.

Typically, in a measurement or data acquisition process, analog signals are received by a digitizer, which may reside in a DAQ device or instrumentation device. The analog signals may be received from a sensor, converted to digital data (possibly after being conditioned) by an Analog-to-Digital Converter (ADC), and transmitted to a computer system for storage and/or analysis. The number of bits that the ADC uses to represent the analog signal is referred to as the resolution. The higher the resolution, the higher the number of divisions the voltage range is broken into, and therefore, the smaller the detectable voltage change. A related parameter is the range, which refers to the minimum and maximum voltage levels that the ADC can span.

A common technique for measuring several signals with a single ADC is multiplexing. A multiplexer selects and routes one channel to the ADC for digitizing, then switches to another channel and repeats. Because the same ADC is sampling many channels, the effective rate of each individual channel is reduced in proportion to the number of channels sampled in addition to time needed to switch or settle each channel.

Typically, after the analog signal is selected by the multiplexer, it is amplified by an instrumentation amplifier before being converted to a digital signal by the ADC. The amplifier must be able to track the output of the multiplexer as it switches channels, and to settle quickly to the accuracy of the ADC. Otherwise, the ADC will convert an analog signal that is still in transition from the previous channel value to the current channel value. The duration required for the amplifier to settle to a specified accuracy is called the settling time. In other words, the settling time is the time for the measurement path to come to equilibrium. This value may vary depending on filtering and user signal output impedance.

A measurement may refer to a single value returned to the user, or to multiple values returned to the user. There are typically three time attributes of a measurement: settle time, switch time, and measure time. Settle time is described above. Switch time refers to the time required for switching and configuring the measurement front end. Each switch (and configuration) constitutes a transition in the measurement process and different transitions may take different amounts of time. Measuring time refers to the time required for the ADC to digitize the signal. Increasing the measurement time can increase the resolution or precision of the measurement.

In a typical data acquisition process, a sequence of measurement specifications, referred to as scan list, is executed by the DAQ device 102A to manage the data measurements. Each entry in the scan list typically contains parameters such as gain, mode, polarity, and trigger information, which specify the manner in which a particular measurement is to be made. A scan refers to a sequence of measurements which is repeated. A scan may specify data acquisition among several channels, e.g., Ch0, Ch3, and Ch9 could be controlled by a single scan. The control afforded by the parameters in a typical prior art scan list is extremely limited, in that timing information must generally be set and remain constant throughout the data acquisition process. Additionally, high-level execution control mechanisms are generally not available at the level of scan list execution.

Generally, the time between the same (corresponding) measurements in different scans is fixed, e.g., the time from Ch0 in one scan to Ch0 in the next scan is always the same. Time between different measurements in the same scan is generally not the same, e.g., the time from Ch0 to Ch3 could be different than the time from Ch3 to Ch9.

Poor settling time is a major problem for DAQ systems because the level of inaccuracy usually varies with gain and sampling rate. In other words, there are situations where measurements with fast and slow settling times occur in the same measurement series. Longer settling times are required if gains are switched, but there are currently no mechanisms for lengthening settling times only where needed. Because these errors occur in the analog stages of the DAQ process, no error messages may be returned to the computer when the amplifier does not settle. In typical DAQ systems, a solution is to set the settle time to the greatest value required for a particular channel gain/sample rate. Similar constraints apply to switching times between channels. In many older models of DAQ hardware, inter-channel delay has to be constant and so all switching times must be set to accommodate the slowest speed switch in the process.

Similarly, not all measurements require the same amount of measurement time. In some cases it may be desirable to dwell on a single channel for an extended time period and average the measurements to achieve a low noise measurement, while in other cases perhaps only a quick check is needed. Furthermore, a longer measurement time may be required to measure slow frequency signals vs. fast frequency signals, given the longer waveform periods of the former. However, in current systems the measurement time is generally fixed, and so the longest time period is usually used for all measurements in a series.

Current prior art measurement systems use scan lists for controlling digitizer operations. However, current prior art scan lists have various drawbacks, primarily including a lack of flexibility in programming or controlling the measurement system. Therefore, improved systems and methods are desired for managing and/or controlling measurement and/ or data acquisition processes.

SUMMARY OF THE INVENTION

One embodiment of the present invention comprises a digitizer operable to be used in a measurement system, wherein the digitizer is operable to acquire data from an external source. In one embodiment, the digitizer comprises a static random access memory (SRAM) which is operable to store a scan list, wherein the scan list comprises a data structure which specifies digitizer operations. The digitizer may further comprise a programmable logic element coupled to the SRAM which is operable to access the scan list from the SRAM and execute the scan list to acquire analog signals from an analog to digital converter (ADC). The programmable logic element may be an FPGA (field programmable gate array) or other type of programmable logic.

The scan list comprises a plurality of entries, wherein each of the plurality of entries comprises parameters specifying digitizer operation. In one embodiment, the parameters comprise one or more of: a switch time specification, a settle time specification, a measure time specification, a looping specification, and a mathematical operation specification. The mathematical operation specification may comprise one or more of a scaling specification (e.g., gain error correction), an adding specification (e.g., offset error correction), and an averaging specification. The looping specification may comprise instructions to repeatedly execute at least one entry in the scan list.

In one embodiment, the digitizer may further comprise an analog to digital converter (ADC) which is operable to receive analog signals from the external source and convert the analog signals to digital signals. The digitizer may also comprise a multiplexer which is operable to read the analog signals from a plurality of channels, a signal conditioner which is operable to receive and modify the analog signals from the multiplexer, and an amplifier which is operable to receive and amplify the analog signals from the signal conditioner.

In one embodiment, the digitizer is comprised in a measurement system that includes a host computer system, wherein the digitizer is coupled to the host computer system. For example, the digitizer may comprise a board comprised in an expansion slot of the host computer system The host computer system may comprise a host memory and a processor, wherein the host memory is operable to store a user application and data acquisition driver software executable by the processor to conduct the data acquisition. In this embodiment, the host computer system is operable to create the scan list and download the scan list to the digitizer.

The various parameters available in the scan list provide a much more flexible and powerful mechanism for controlling measurement system operations. The improved scan list thus provides a more powerful and/or more efficient measurement system.

BRIEF DESCRIPTION OF THE DRAWINGS

Other advantages and details of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF VARIOUS EMBODIMENTS

Figure 1:
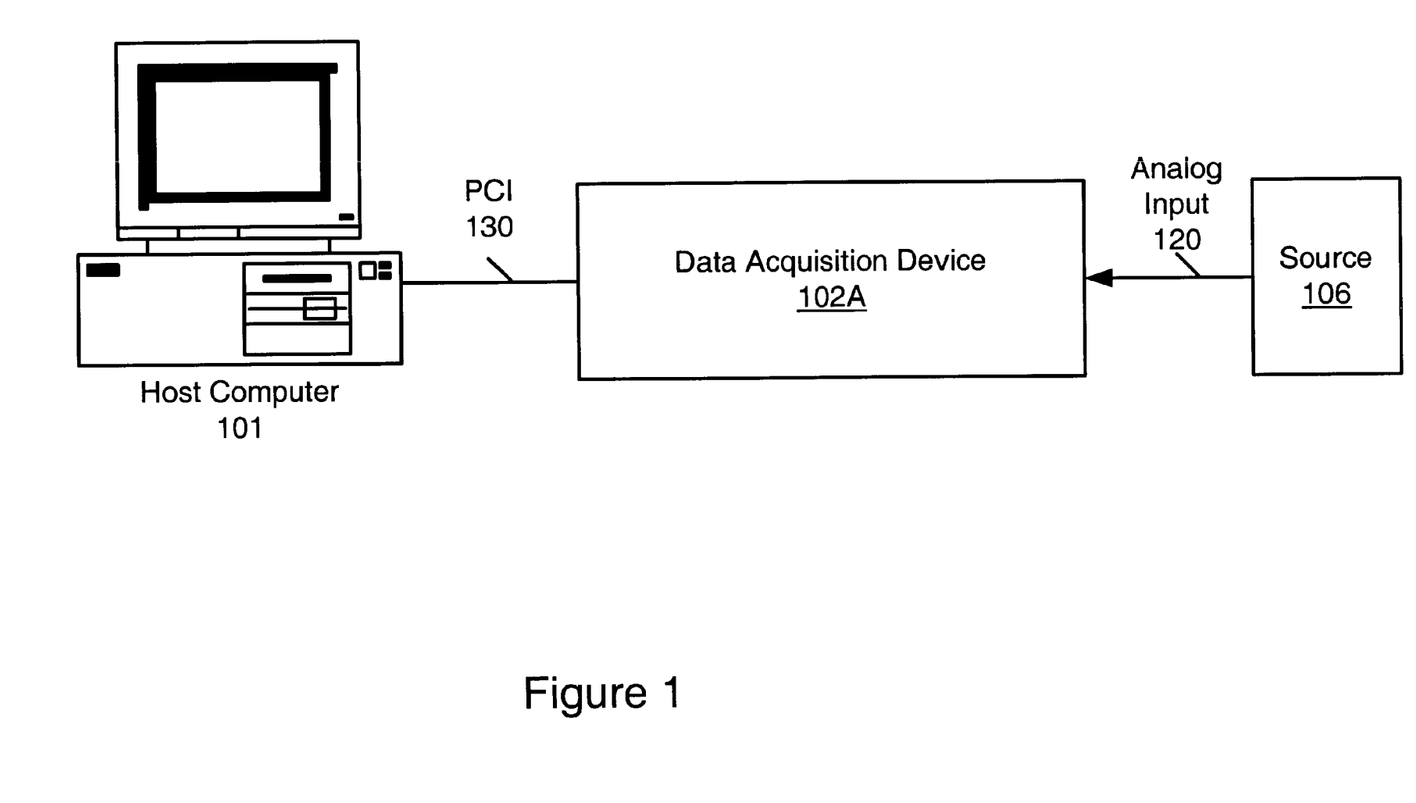
FIG. 1 illustrates a data acquisition system, according to one embodiment.

FIG. 1: A Data Acquisition System According to the Prior Art

FIG. 1 is a diagram of a computer-based measurement system or data acquisition system according to one embodiment. Computer system 101 may be coupled to a measurement device, referred to as data acquisition (DAQ) device 102A, through a communication medium 130, such as a PCI bus. The DAQ device 102A may be an internal card or board coupled to a PCI bus, but is shown external to the computer for illustrative purposes. The measurement device or DAQ device 102A may also be an external device coupled to the computer system 101. In this embodiment, the communication medium 130 may be a serial bus, such as USB, IEEE 1394, MXI-3, Ethernet, or a proprietary bus, or a parallel bus such as GPIB or others.

The DAQ device 102A may be coupled to an external source, such as an instrument, sensor, transducer, or actuator 106 from which the DAQ device 102A may receive analog input 120, such as sensor data. In one embodiment, the source 106 may be any type of sensor which is operable to detect environmental conditions and send sensor data to the DAQ device 102A. The DAQ device 102A combined with the source 106 may be operable to collect data concerning any of various phenomena, such as pressure, temperature, chemical content, current, resistance, voltage, or any other detectable attribute.

The computer system 101 may be operable to control the DAQ device 106 by sending requests to read from or write to the DAQ device's memory registers. The computer system 101 may also be operable to prepare a scan list according to one embodiment of the present invention and transfer the scan list to a memory of the DAQ device 102A for execution by the DAQ device 102A. The computer system 101 may be further operable to obtain data from the DAQ device 102A for storage and analysis on the computer system 101, either by issuing read requests or by programming the DAQ device 102A to send data to the memory of the computer 101. Additionally, the computer system 101 may be operable to send data, such as waveform data, to the device 102A for various purposes, such as for use in stimulating a unit under test (UUT).

The host computer 101 may include a processor, and a memory which is operable to store a user application and a driver software program. The user application may be executable by the processor to conduct the data acquisition process. The driver software program may be executable by the processor to receive data acquisition tasks from the user application and translate the data acquisition tasks into low-level register writes to the digitizer 208. The driver software program may also be executable to prepare the scan list according to one embodiment of the present invention and transfer the scan list to a memory of the DAQ device 102A for execution.

Figure 2A:
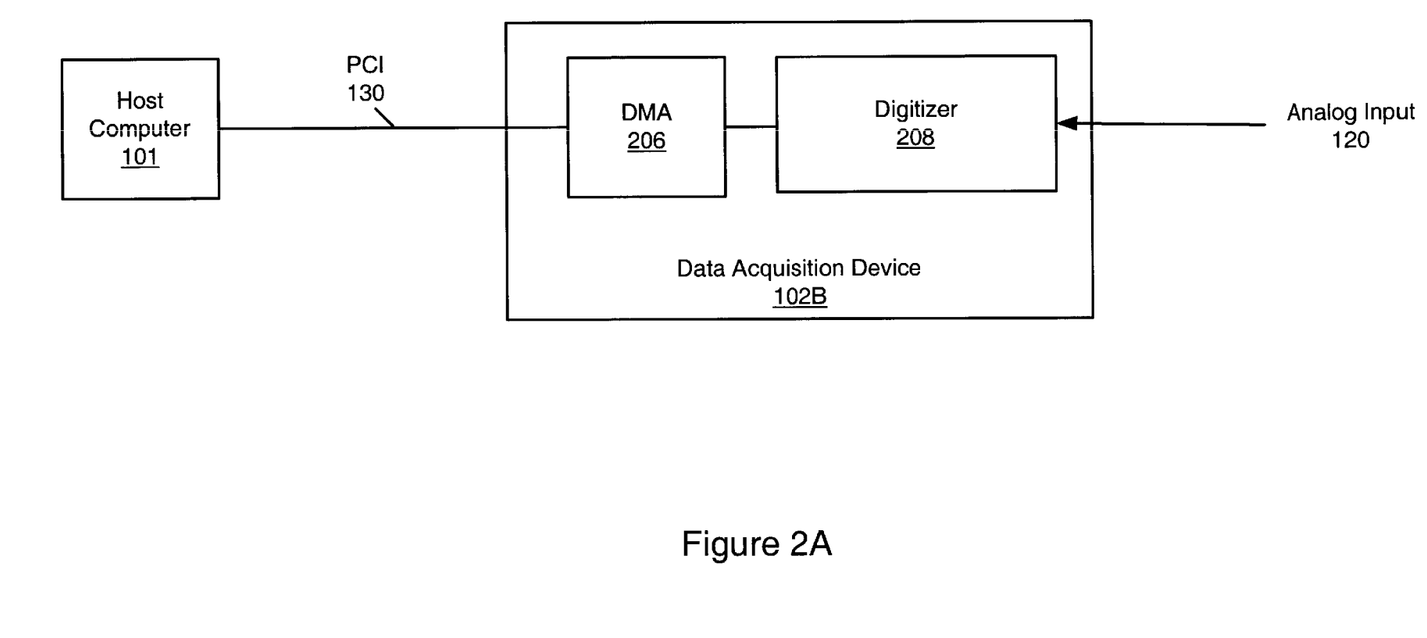
FIGS. 2A & B are block diagrams of two embodiments of a data acquisition system.

FIG. 2A: a Data Acquisition System

FIG. 2A is a block diagram illustrating one embodiment of the data acquisition system of FIG. 1. As FIG. 2A shows, a data acquisition (DAQ) device 102B may be coupled to a host computer 101 through a communication medium, such as PCI bus 130. The DAQ device 102B may include a digitizer 208 coupled to a Direct Memory Access (DMA) controller 206. In one embodiment, the DMA controller may comprise the National Instruments mMite™ DMA controller. The DMA controller 206 may communicate with the host computer 101 through the PCI bus 130 and may communicate with the digitizer 208 through a simple I/O interface. Thus, the DMA controller 206 may be operable to translate and transfer data communicated between the host computer 101 and the digitizer 208. The DMA controller 206 may provide a plurality of channels through which data may be transferred between the instrument 106 and the host computer 101.

As FIG. 2A shows, the digitizer 208 may receive an analog input 120, such as a signal from the external source, and convert the analog signal to a digital signal. The digitizer 208 may then send the digital signal to the DMA controller 206, which may translate the digital signal to a PCI format and transmit the formatted signal to the host computer 101 for storage and/or analysis. The DAQ device 102B may store and execute a scan list according to one embodiment of the invention, described in more detail below.

Figure 2B:
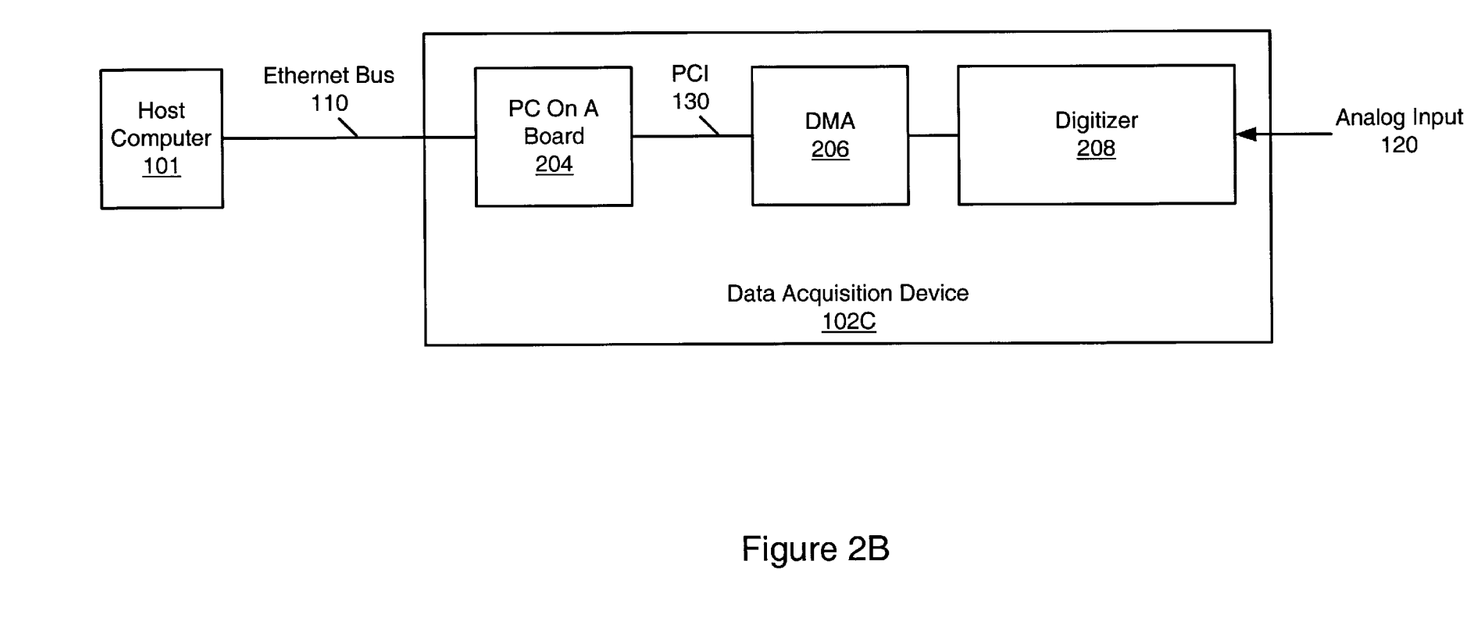

FIG. 2B: a Data Acquisition System

FIG. 2B is a block diagram of a DAQ system, according to another embodiment. As FIG. 2B shows, the DAQ system is similar to that described above with reference to FIG. 2A, with the following changes. The DAQ device 102C may be coupled to the host computer 101 through an Ethernet bus 110, rather than the PCI bus 130 of FIG. 2. The DAQ device 102C may also be coupled to the host computer 101 through another communication medium, such as a serial bus, VXI bus, or MXI-3 bus. The DAQ device may also include an embedded processing system or controller 204, referred to as a "PC on a board," coupled to the DMA controller 206 through the PCI bus 130, and to the host computer 101 through the Ethernet bus 110. Thus, the embedded processing system 204 may communicate with the host computer 101 through the Ethernet bus 110 and may communicate with the DMA controller 206 through PCI bus 130.

The embedded processor system 204 may be operable to execute a real-time operating system (OS) and to store and execute driver software to receive data acquisition tasks from the user application and translate the data acquisition tasks into low-level register writes to the digitizer 208. The DAQ device 102C may also store and execute a scan list according to one embodiment of the invention.

As described above with reference to FIG. 2A, the digitizer 208 may receive an analog input 120, such as a signal from a sensor or actuator, and convert the analog signal to a digital signal. The digitizer 208 may then send the digital signal to the DMA controller 206, which may translate the digital signal to a PCI format and transmit the formatted signal to the embedded processor system 204, which may then transfer the data over the Ethernet bus 110 to host computer 101 for storage and/or analysis.

The digitizer 208 may also include logic to perform additional functions such as signal conditioning, amplification, and execution control, described below with reference to FIG. 3.

Figure 3:
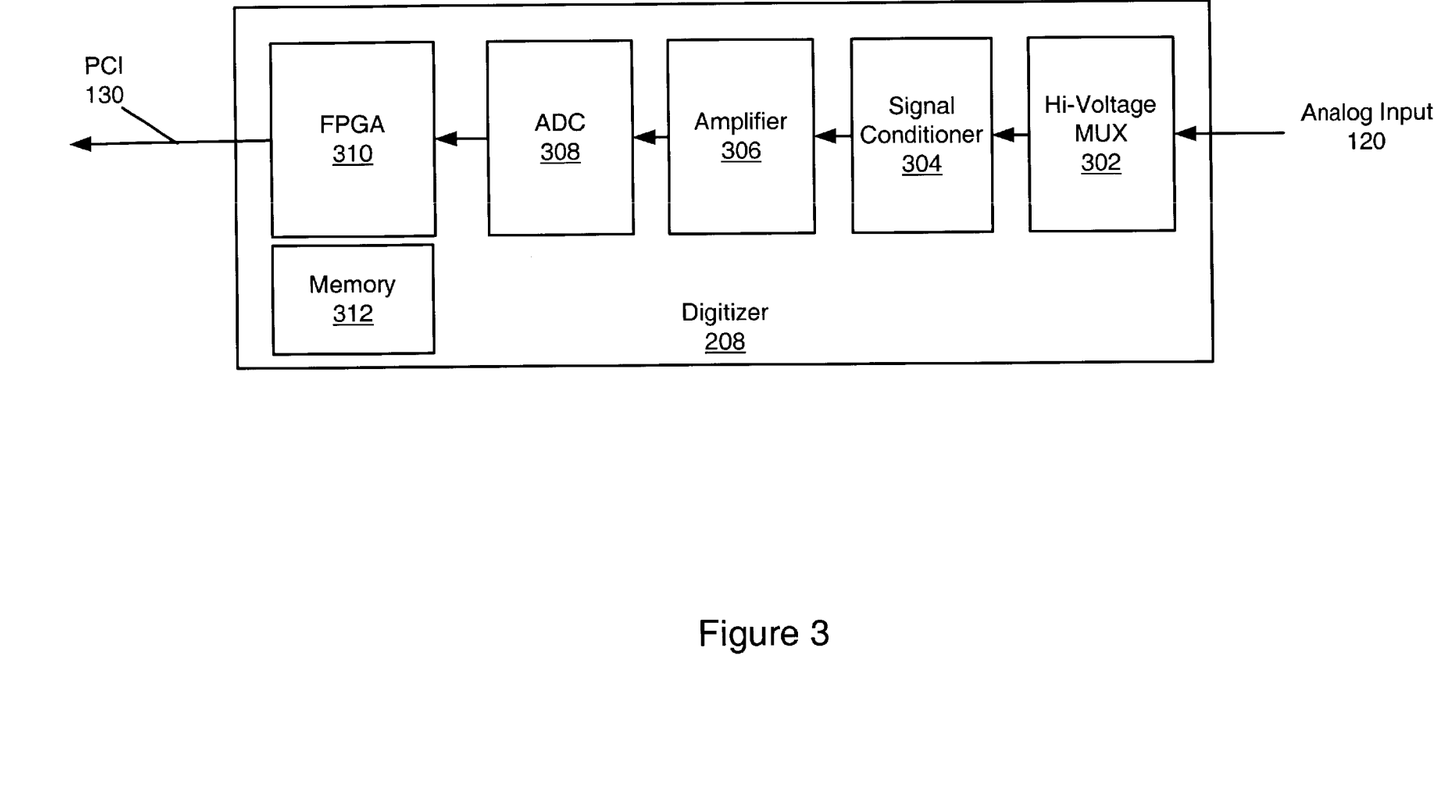
FIG. 3 is a block diagram of a digitizer, according to one embodiment.

FIG. 3: a Digitizer

FIG. 3 is a block diagram of digitizer 208, according to one embodiment. As FIG. 3 shows, the digitizer 208 may include a High-Voltage Multiplexer (MUX) 302, coupled to a signal conditioner 304, which may be coupled to an amplifier 306, which may be further coupled to an Analog to Digital Converter (ADC), and which may be finally coupled to a programmable logic element, such as a Field Programmable Gate Array (FPGA) 310.

In one embodiment, the MUX 302 may comprise a plurality of I/O channels which are operable to receive analog input 120 from instrument 106. As described above, the MUX 302 may cycle through the plurality of channels, sampling data from each and transmitting the data to the signal conditioner 304. The signal conditioner 304 may receive the analog data and perform various conditioning operations to re-cast the data into a more usable form. For example, the signal conditioner 304 may perform AC coupling on the signal, which refers to removing the DC component of the signal, or DC coupling, which allows both AC and DC components of the signal. In one embodiment, the signal conditioner 304 may further allow ohms measurement of the signal. The signal conditioner 304 may then send the processed signal to the amplifier 306, where the signal voltage may be increased (or decreased), then sent to the ADC 308. The ADC 308 may convert the analog signal to digital data and send the digital data to the FPGA 310, which may send the data in PCI format to the host computer 101 or to the embedded processor system 204, depending upon the particular embodiment deployed.

The FPGA 310 may be coupled to a memory 312, such as a static random access memory (SRAM), which may be operable to store a scan list (described below in more detail) which may include a plurality of scan list entries specifying various DAQ operation parameters, such as gain, mode, polarity, and trigger information for the DAQ process. In one embodiment, the scan list entries may also include various timing parameters, such as settle time, switch time, and measure time, as well as execution ordering parameters which may specify instructions to repeatedly execute individual entries or sequences of entries. The scan list entries may further include specifications for various mathematical operations, including scaling, addition, and averaging. For example, a scaling operation may be specified for gain error correction, or an addition operation may be specified for offset error correction. The FPGA 310 may be operable to execute the scan list to perform the data acquisition process with a degree of control not previously available in the art, as described in more detail below.

Figure 4:
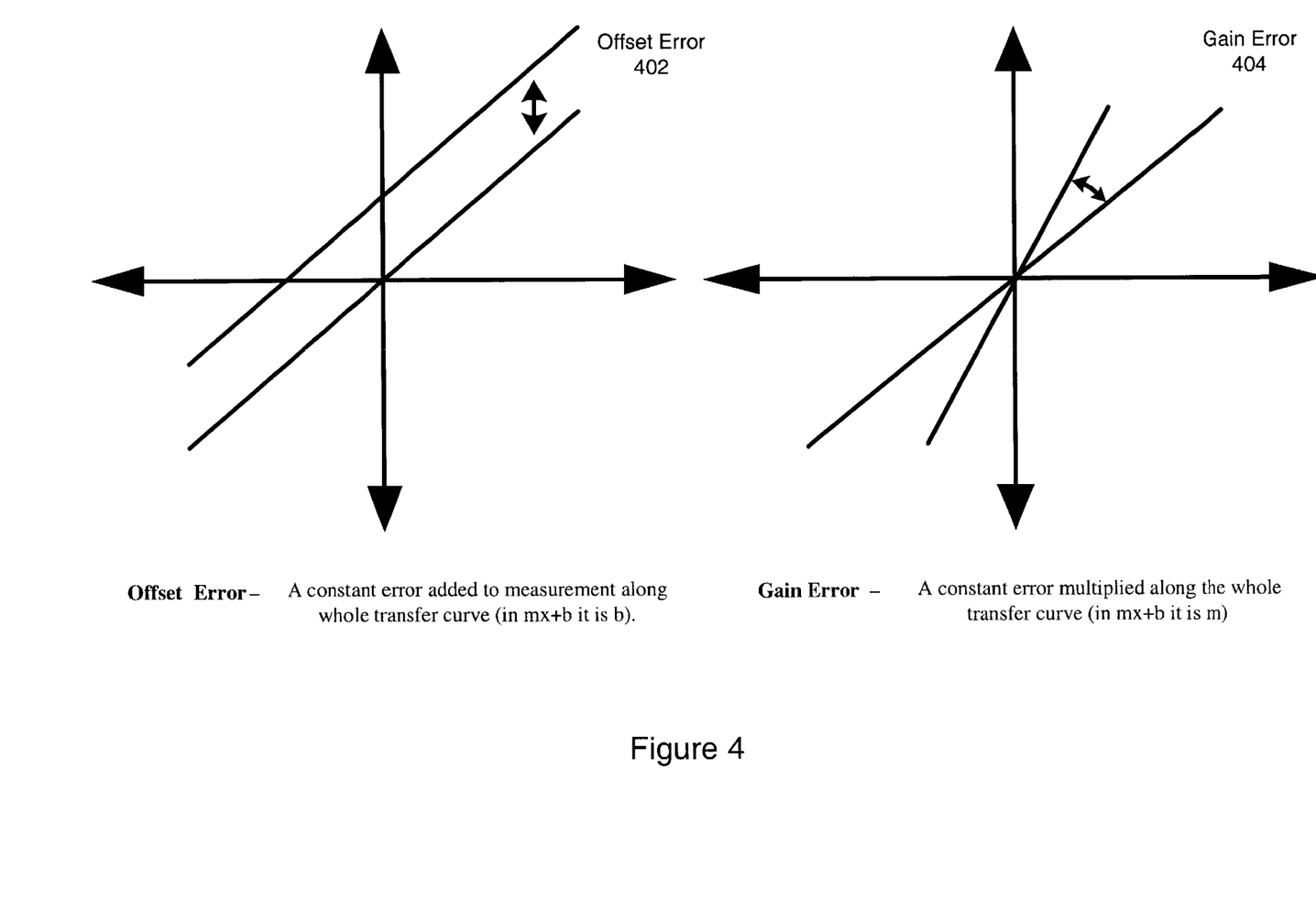
FIG. 4 illustrates offset and gain error.

FIG. 4: Offset and Gain Error

FIG. 4 illustrates the concepts of offset error and gain error. When an analog signal is measured, such as from an instrument or sensor, the voltage level of the signal may be subject to various errors due to synergistic effects of the component circuitry. Two such errors are offset error 402 and gain error 404. As FIG. 4 shows, offset error 402 refers to a constant error or value which is added to the measurement along the entire transfer curve. For example, if a data acquisition system has an offset error of +2 volts, then an actual value of 0 volts (the zero point) will be measured as 2 volts, an actual value of 0.5 volts will be measured as 2.5 volts, an actual value of −3.5 volts will be measured as −1.5 volts, etc. Thus, a simple addition (or subtraction) may be applied to all measured values to calibrate the system appropriately.

The gain error 404 refers to a multiplicative error which may affect the values measured in a data acquisition operation. For example, if a system has a gain error of 2, then all measured values will be twice the actual values, and so an actual value of 3 volts will be measured as 6 volts, an actual value of −0.4 volts will be measured as −0.8 volts, etc. Thus, a constant multiplication (or division) may be applied to each measured value to calibrate the system.

Errors such as these may be corrected via entries in the scan list which specify the constant values to be added to or multiplied by the measured values in the measurement or data acquisition process. Details of the scan list format are presented below with reference to FIG. 5.

Figure 5:
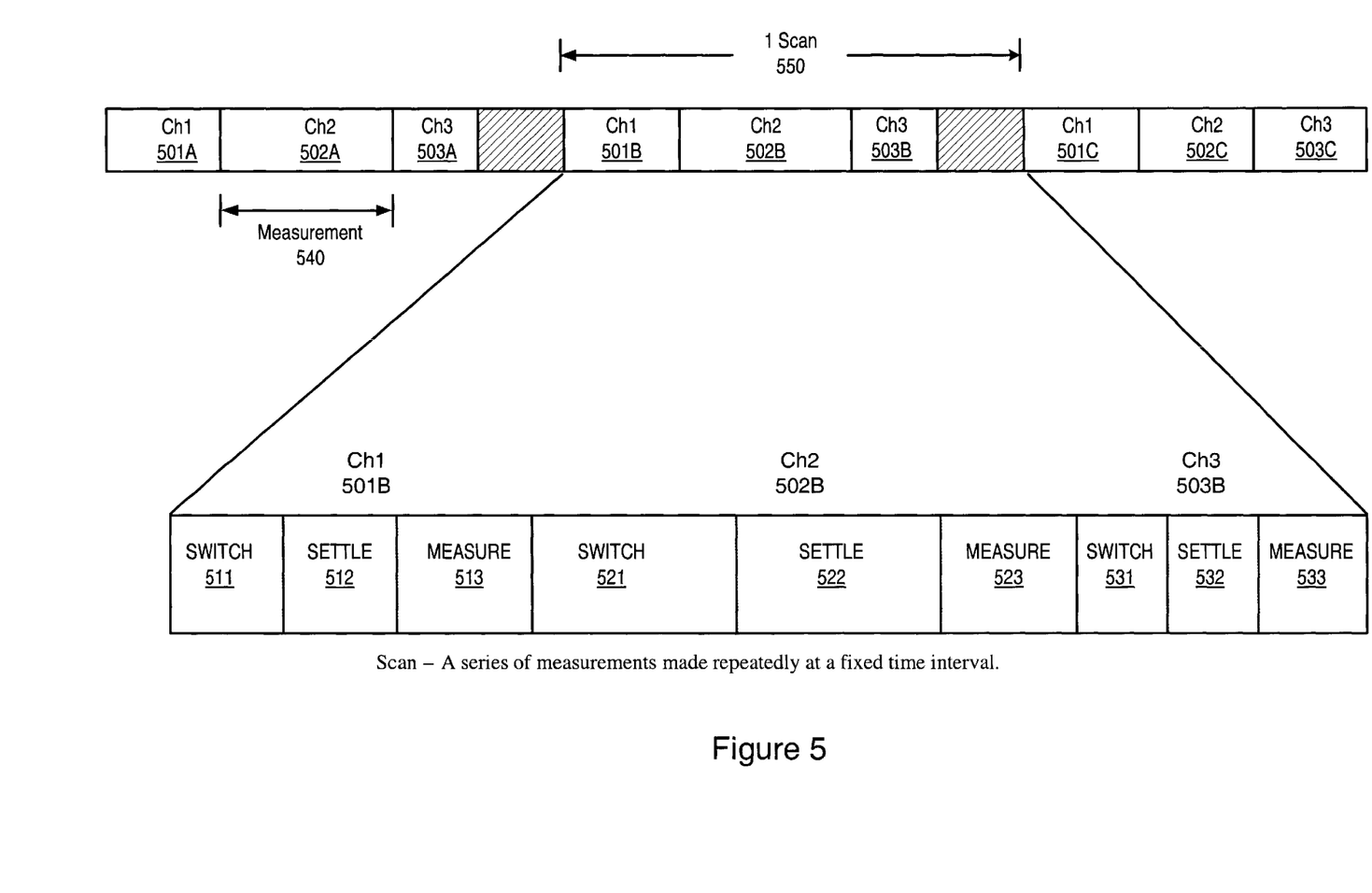
FIG. 5 illustrates a scan list, according to one embodiment.

FIG. 5: a Scan List

FIG. 5 illustrates a scan list, according to one embodiment. As described above, a scan list preferably comprises a sequence of measurement specifications which is executed by the DAQ device 102(B or C) to manage data measurements. Each entry in the scan list typically contains parameters such as gain, mode, polarity, or trigger information, which specify the manner in which a particular measurement is to be made. In one embodiment the entries may include timing parameters such as settle time, switch time, and measure time, as well as execution ordering parameters, such as looping specifications. For example, a looping specification may indicate that a particular entry or sequence of entries is to be repeated a number of times.

A scan list may be distinguished from a software program in that a scan list does not comprise a sequence of executable instructions, but rather stores a sequence of parameter values which can be used by a device, such as FPGA 310, to implement a procedure, such as a sequence of measurements.

As shown in FIG. 5, a scan 550 comprises a sequence of measurements which is repeated at a fixed time interval. A scan may specify data acquisition among several channels, e.g., Ch1 501, Ch2 502, and Ch3 503 may be controlled by a single scan. As FIG. 5 shows, a measurement may refer to a single measurement made on a single channel, such as measurement 540 made on channel 2 502.

FIG. 5 shows an example of a scan over three channels. In this example, the scan includes an entry each for switch 511, settle 512, and measure 513 parameters for each channel, e.g., for channel 1 501B, the entries are switch 511, settle 512, and measure 513; for channel 2 502B, the entries are switch 521, settle 522, and measure 523, etc. As described above, the switch time refers to the time allowed to switch and configure channels for the current measurement. Settle time refers to the time allowed for the gain to transition from the value of the preceding measurement to the current measurement. Finally, measure time refers to the time allowed for making the current measurement. Typically, the longer the measure time, the greater the accuracy of the measurement.

The fact that the scan list described herein allows such parameters to be set on a per measurement basis greatly increases the user's control over the data acquisition process, and improves the efficiency with which the process may be executed. For example, whereas previous approaches necessitated that switch time be set to accommodate the slowest switches used in a data acquisition sequence, the scan list described herein allows the user to set the switch time to match the particular switch corresponding to the current measurement.

In one embodiment, the scaling operations specified by entries in the scan list may be performed by dedicated hardware, which may provide substantial improvements in performance over previous approaches where scaling operations are performed by software by making the timing very deterministic and accurate.

Figure 6:
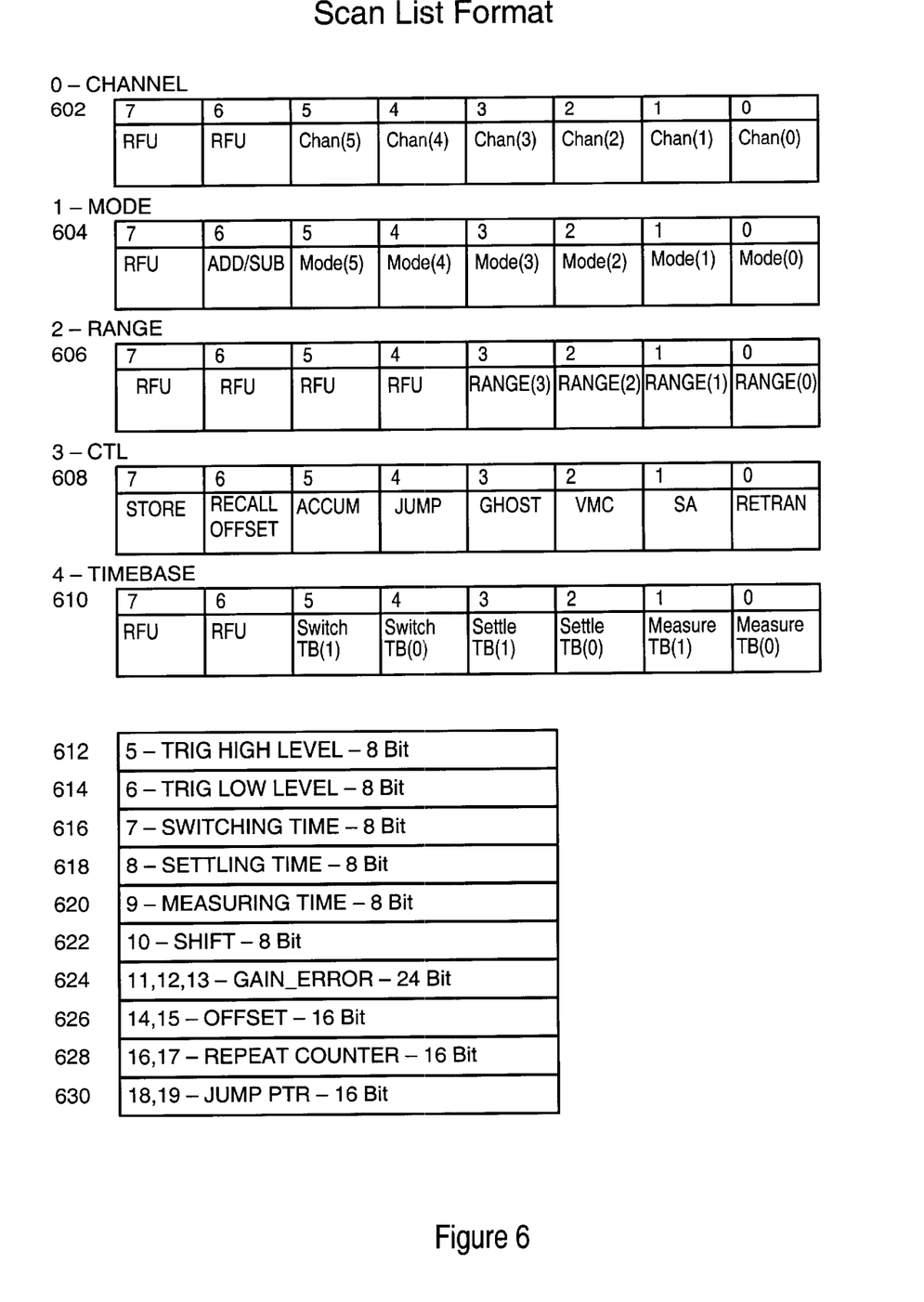
FIG. 6 illustrates a scan list entry format, according to one embodiment.

FIG. 6: Scan List Entry Format

FIG. 6 illustrates one embodiment of a scan list entry format. As FIG. 6 shows, in one embodiment, each scan list entry has a format of 20 bytes of information allowing for extremely flexible timing, scaling, triggering, and sequencing. The scan list format and contents are described below.

The first byte of the entry, byte-0 602, comprises channel information, as indicated in FIG. 6. As shown, bits 0 through 5 (chan(0)–chan(5)) correspond to channels 0 through 5 respectively. Bits 6 and 7 are reserved for future use (RFU).

Byte-1 604 comprises mode information. In one embodiment, the bits of the mode byte 604 may represent the following fields and bit values:

mode(6): ADD/SUB

| | |
|---|---|
| ADD 1 | accumulate by adding |
| SUB 0 | accumulate by subtracting |

The ADD/SUB field is typically used in conjunction with the accumulation (ACUM) bit and looping functionality.

| mode (5): | ACnDC |
|---|---|
| AC | 1 |
| DC | 0 |

The ACnDC field specifies whether to AC couple the signal or not (DC). AC coupling refers to passing the signal through a low pass filter.

| mode (4–3): | Filter Setting |
|---|---|
| no filter | 0 |
| mid filter | 1 |
| low filter | 2 |

| mode(2–0): | signal type |
|---|---|
| 4 W Ohms | 1 |
| 2 W Ohms | 2 |
| 2 W Volts | 3 |
| 1 W Volts | 4 |
| 2 W Frequency | 5 |
| 1 W Frequency | 6 |

Byte-2 606 comprises range information. Some values specifying range may depend upon the mode. In one embodiment, the range bits may represent the following:

| range(1–0): | gain |
|---|---|
| .5:1 | 0 |
| 1:1 | 1 |
| 10:1 | 2 |
| 50:1 | 3 |

| range(3–2): (mode dependent) | |
|---|---|
| Ohms mode: | current src |
| 10 microA | 2 |
| 1 mA | 1 |

| Volts mode: | attenuation |
|---|---|
| 1:1 | 0 |
| 100:1 | 1 |

| Frequency mode: | TB and Attenuation |
|---|---|
| 1:1 | 0 |
| 100:1 | 1 |

Byte-3 608 comprises control information. In one embodiment, the control bits may represent the following instructions:

control(7): store offset—store the current measurement for future use as an offset in the front-end SRAM. The FPGA will use the OFFSET field as an address. Typically GHOST should also be set so the offset measurement isn't returned to the user.

control(6) recall offset—recall an offset from front-end SRAM. The FPGA uses the OFFSET field as an address.

control(5): ACCUM—accumulate the current measurement with the previous measurement.

control(4): LOOP—jump to the offset stored in the JUMP_PTR field. Loop for the number of entries set in the REPEAT_COUNTER field. if REPEAT_COUNTER is set to 0 the device may go into an infinite loop.

control(3): GHOST—execute scan list entry as normal, but don't return data to user.

control(2): VMC (Trig Out)—generate a VMC pulse at the completion of the MEASURE phase.

control(1): SA (Trig In)—wait for an SA trigger pulse before advancing from SWITCH to SETTLE.

control(0): JUMP—jump to the offset stored in the JUMP_PTR byte fields.

TB(7) STOP—Indicates end of scan.

Byte-4 610 comprises time-base information. In one embodiment, the time-base bits may represent the following instructions: (Bits 6 and 7 are RFU)

time-base(5-4): SWITCH_TB—scale SWITCH by 2^(8*SWITCH_TB)

time-base(3-2): SETTLE_TB—scale SETTLE by 2^(8*SETTLE_TB)

time-base(1-0): MEASURE_TB—scale MEASURE by 2^(8*MEASURE_TB)

Byte-5 612: TRIG HIGH LEVEL—(8 bit) set the PWM output value for analog TRIG HIGH LEVEL. This also generates voltages for self-calibration.

Byte-6 614: TRIG LOW LEVEL—(8 bit) set the PWM output value for analog TRIG LOW LEVEL.

Byte-7 616: SWITCH—(8 Bit) duration to wait for switching in TICKs. This may be scaled by SWITCH_TB. Tick refers to the time necessary to make an ADC conversion.

Byte-8 618: SETTLE—(8 Bit) duration to wait for settling in TICKs. This may be scaled by SETTLE_TB.

Byte-9 620: MEASURE—(8 Bit) duration to measure in TICKs. This may be scaled by MEASURE_TB.

Byte-10 622: SHIFT—(8 Bit) binary shift-left value used in conjunction with multiplication to average incoming data.

Bytes (11–13) 624: GAIN_ERROR—(24 Bit) 1.23 unsigned fixed point constant. This value is multiplied by the measurement, and is used for removing gain error, and for dividing the accumulated values to average multiple measurements.

Bytes (14–15) 626: OFFSET—(16 Bit) 8.8 signed fixed point constant. This value is used to adjust the offset error of the averaged measurement. If the AZ/MEM (auto-zero/memory) bit is set this represents the address of an AZ measurement to be used for offset adjustment instead.

Bytes (16–17) 628: REPEAT_COUNTER—(16 Bit) number of times to repeat looped scan list entries, or a single entry if LOOP is not set.

Bytes (18–19) 630: JUMP_PTR—(16 Bit) offset to jump to upon receiving the JUMP or LOOP command.

Note that some of the terms have a particular format, referred to as fixed point constant, notated as n.m, and interpreted as $2^n+2^{n-1}+\ldots+2^1+2^0+2^{-1}+\ldots 2^{1-m}+2^{-m}$. The floating point value may be calculated by interpreting the field as an integer and dividing by $2^m$.

The addition of extra timing information into the scan list and its interpretation with dedicated hardware may provide extremely accurate, flexible, and reliable timing of scan list execution. Adding the timing information to scan list entries allows a data acquisition system to flexibly and optimally handle multiple speed switches. For example, a data acquisition system may utilize a combination of ultra fast low voltage FET switches, high voltage 1 ms photomos switches, and 10 ms mechanical relays. The inclusion of switch timing information per measurement provides the capability to only wait the minimum time for each switch to complete. The inclusion of variable measurement time per entry also facilitates the measurement of frequency, because a much longer time is required to measure slow frequencies than fast frequencies. There are also benefits to setting settling time per measurement, in that measurements having fast and slow settling times may be combined. Longer settling times are typically required if gains are switched.

The inclusion of scaling and offset correction information in the scan list may allow per gain correction and simple math functions including averaging, scaling, subtraction, and summing, all of which may be performed in hardware (as opposed to firmware) reliably at the scanning speed.

In the preferred embodiment, one sample or conversion per tick is taken during the measurement period. The conversions may be averaged together and scaled to provide a final measurement value. Averaging and scaling may be combined into addition, division by a power of two, and multiplication.

Averaging:

n—number of ticks to be taken(no units) (MEASURE*$2^{MEASURE\_TB*4}$) (shouldn't exceed $2^{16}$)

M—Measurement 24 bit averaged and scaled data (16.8 signed integer ADC Code) (first version will only return the top 16 bits)

$C_i$—Conversion i of a series of conversions (16 bit signed integer ADC Code)

O—Offset Error-Signed (8.8 signed integer in ADC Codes)

G—Gain Error and Division Correction-Unsigned 24 bit integer (no units)

SHIFT—Course division by powers of 2 for averaging (no units)

Gain Error—Calibration constant stored on the board

Offset Error—Calibration constant stored on the board $$M=(\text{Sum}(i=0 \text{ to } n)(C_i)*(G*2^{SHIFT-16})-O$$

Calculation of Shift, G, and O (scan list constants):

SHIFT=16-floor ($\log_2$ n)

$G=2^{16-floor(\log_2 n)}/n$*Gain Error

O=Offset Error

Substituting simplifies equation to:

$$M=(\text{Sum}(i=0 \text{ to } n)(Ci)/n)*\text{Gain Error}-\text{Offset Error}$$

As noted above, the inclusion of scaling parameters in scan list entries allows per gain error correction. Error correction constants may be changed per measurement or even per entry. Prior art approaches typically use calibration digital/analog converters (cal-dacs) for error correction at the analog stage, by calibrating the cal-dac to determine the error, then adjusting the cal-dac to remove the error. However, cal-dac configurations are generally not easily or quickly changed. The approach to scaling described above may be applied at the digital stage of the measurement process, and generally involves simple subtractions and multiplications. The approach facilitates averaging multiple points together to reduce noise, and through the use of looping (described below), the accumulation bit, and the add/sub bit, it may be possible to interleave offset and measurement operations to remove low frequency 1/f noise. This technique may also be applied between two channels to generate a pseudo differential measurement. The calculations are internal to the device so that data may be averaged to 24 bit precision without losing bits due to fixed point math errors.

As mentioned above, the scan list may also include the ability to repeat a single entry multiple times, or to repeat multiple entries in a loop. This allows the combination of scan list entries to perform more complicated measurements such as continuously auto-zeroing (AZ), and averaging to remove low frequency noise.

Looping may be used to compact the size of the scan list if an external switch is the only thing that is changed. The looping capability in combination with the timing advantages described above allows the construction of arbitrarily complex sequences of measurements in a reasonable number of entries. Looping also makes multi-rate scanning much more compact as compared to previous methods, and allows a buffer of data to be scanned rather than just single points. For example, using the method described above, one may scan a buffer, then perform a Fast Fourier Transform (FFT) on multiple high voltage (HV) channels.

Figure 7:
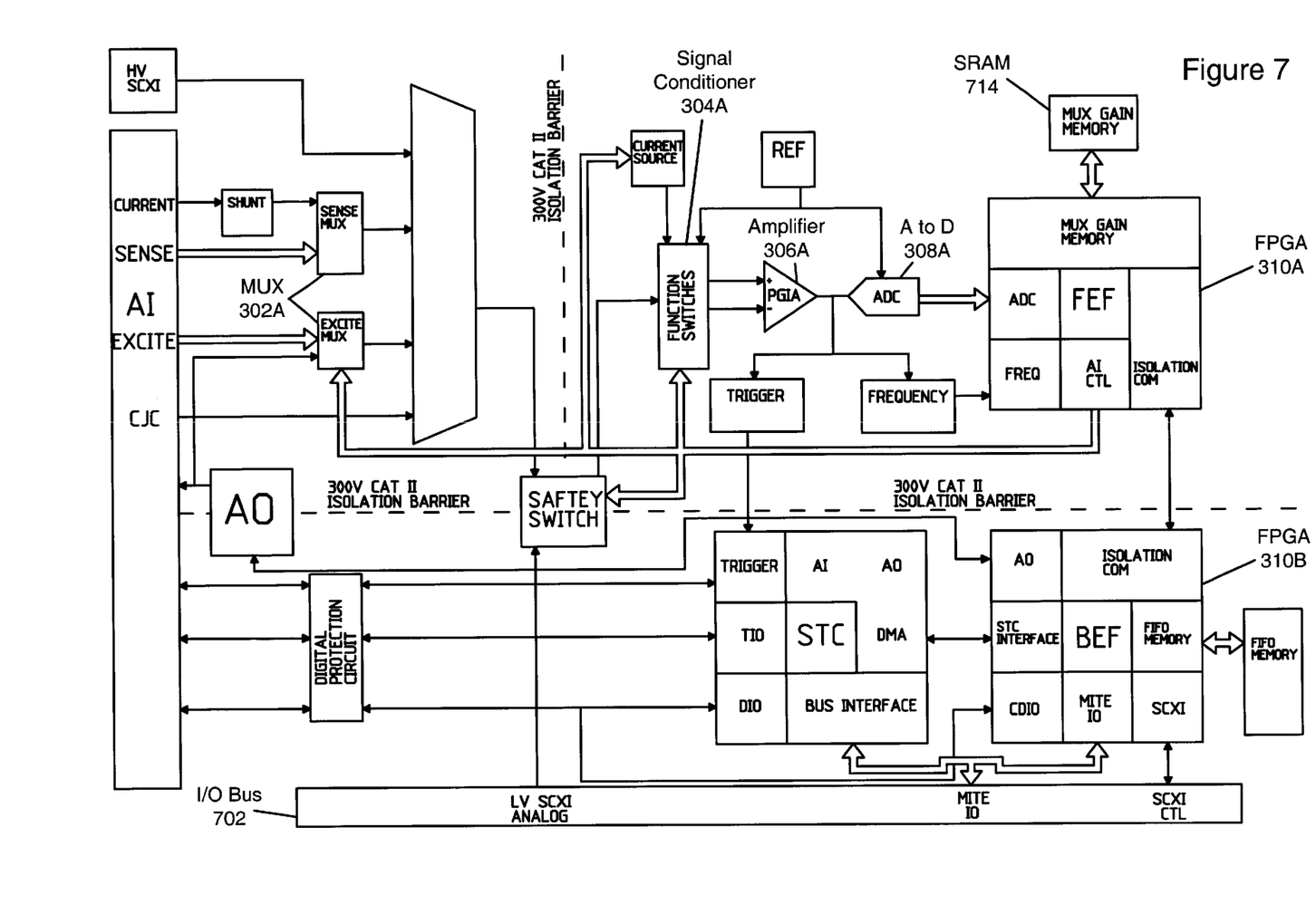
FIG. 7 illustrates a digitizer architecture, according to one embodiment.

FIG. 7: One Embodiment of a Digitizer Architecture

FIG. 7 is a diagram of one embodiment of a digitizer architecture. It should be noted that only the components directly related to various embodiments of the present invention are labeled and discussed.

As FIG. 7 shows, I/O bus 702 may be coupled to FPGA 310B, referred to as the "back-end" FPGA, which may be coupled to FPGA 310A, referred to as the "front-end" FPGA, through a serial protocol. Note that the two FPGAs 310A/B may be separated by an isolation barrier for safety reasons. In one embodiment, the FPGA 310B may be operable to serialize commands from the I/O port 702 and send the serialized commands to the FPGA 310A, as well as to de-serialize data from the FPGA 310A and store the de-serialized data in a FIFO buffer for transferal to the host computer 101.

FPGA 310A may be further coupled to SRAM 714 and A-to-D converter 308A. The A-to-D converter 308A may be further coupled to amplifier 306A. In one embodiment, the amplifier 306A may comprise a programmable gain instrumentation amplifier (PGIA). The amplifier 306A may be coupled to signal conditioner 304A which may receive signals from multiplexer (MUX) 302A, shown as a sense MUX and an excite MUX in FIG. 7.

In one embodiment, the digitizer described above may operate according to the descriptions of FIGS. 1–6 above.

Thus the system and methods described above provide improved measurement and data acquisition capabilities as compared to the prior art.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A digitizer in a measurement system, wherein the digitizer is operable to acquire data from an external source, the digitizer comprising:
   an analog to digital converter (ADC) which is operable to receive analog signals from the external source and convert the analog signals to digital signals;
   a memory which is operable to store a scan list, wherein the scan list comprises a data structure which specifies digitizer operations; and
   an element coupled to the memory which is operable to access the scan list from the memory and execute the scan list to acquire the analog signals from the external source;
   wherein the scan list comprises a plurality of entries, wherein each of the plurality of entries comprises parameters specifying digitizer operation; and
   wherein, for at least a subset of the plurality of entries, the parameters comprise two or more of:
      a switch time specification;
      a settle time specification; and
      a measure time specification.

2. The digitizer of claim 1,
   wherein, for the at least a subset of the plurality of entries, the parameters comprise:
      a switch time specification;
      a settle time specification; and
      a measure time specification.

3. The digitizer of claim 1, wherein the parameters comprise a looping specification, wherein the looping specification specifies repeated execution of a specified subset of scan list entries.

4. The system of claim 3, wherein the looping specification provides an ability to jump to any scan list entry.

5. The system of claim 4, wherein the looping specification provides an ability to jump to any scan list entry and independently mark the end of the scan list.

6. The digitizer of claim 1, wherein the parameters comprise a mathematical operation specification, wherein the mathematical operation specification comprises one or more of a scaling specification, an adding specification, and an averaging specification.

7. The digitizer of claim 1, wherein the digitizer further comprises:
   a multiplexer which is operable to read the analog signals from a plurality of channels;
   a signal conditioner which is operable to receive and modify the analog signals from the multiplexer; and
   an amplifier which is operable to receive and amplify the analog signals from the signal conditioner.

8. The digitizer of claim 1, wherein the element is a programmable logic element.

9. A measurement system, comprising:
   a digitizer, wherein the digitizer is operable to couple to an external source, wherein the digitizer is operable to store and execute a scan list to acquire analog signals from the external source, wherein the scan list comprises a data structure which specifies digitizer operations, wherein the digitizer is operable to convert the analog signals to digital signals;
   wherein the scan list comprises a plurality of entries, wherein each of the plurality of entries comprises parameters specifying a data acquisition operation; and
   wherein, for at least a subset of the plurality of entries, the parameters comprise two or more of:
      a switch time specification;
      a settle time specification; and
      a measure time specification.

10. The measurement system of claim 9,
    wherein, for the at least a subset of the plurality of entries, the parameters comprise:
       a switch time specification;
       a settle time specification; and
       a measure time specification.

11. The measurement system of claim 9, wherein the parameters comprise a looping specification, wherein the looping specification specifies repeated execution of a specified subset of scan list entries.

12. The measurement system of claim 11, wherein the looping specification provides an ability to jump to any scan list entry.

13. The measurement system of claim 12, wherein the looping specification provides an ability to jump to any scan list entry and independently mark the end of the scan list.

14. The measurement system of claim 9, wherein the digitizer comprises:
    an analog to digital converter (ADC) which is operable to receive the analog signals from the external source and convert the analog signals to digital signals;
    a memory which is operable to store the scan list, wherein the scan list comprises a data structure which specifies digitizer operations; and
    an element coupled to the memory which is operable to access the scan list from the memory and execute the scan list to acquire the analog signals from the external source.

15. The measurement system of claim 14, wherein the element is a programmable logic element.

16. The measurement system of claim 14, wherein the digitizer further comprises:
    a multiplexer which is operable to read the analog signals from a plurality of channels;
    a signal conditioner which is operable to receive and modify the analog signals from the multiplexer; and
    an amplifier which is operable to receive and amplify the analog signals from the signal conditioner.

17. The system of claim 9, wherein the parameters comprise a mathematical operation specification, wherein the mathematical operation specification comprises one or more of a scaling specification, an adding specification, and an averaging specification.

18. The system of claim 9, further comprising:
    a host computer system, wherein the digitizer is coupled to the host computer system, wherein the host computer system comprises a host memory and a processor, wherein the host memory is operable to store a user application and data acquisition driver software executable by the processor to conduct the data acquisition; and
    wherein the host computer system is operable to create the scan list and download the scan list to the digitizer.

19. The system of claim 18,
    wherein the digitizer comprises a board comprised in an expansion slot of the host computer system.

20. A digitizer in a measurement system, wherein the digitizer is operable to acquire data from an external source, the digitizer comprising:

an analog to digital converter (ADC) which is operable to receive analog signals from the external source and convert the analog signals to digital signals;

a memory which is operable to store a scan list, wherein the scan list comprises a data structure which specifies digitizer operations; and an element coupled to the memory which is operable to access the scan list from the memory and execute the scan list to acquire the analog signals from the external source;

wherein the scan list comprises a plurality of entries, wherein each of the plurality of entries comprises parameters specifying digitizer operation; and wherein the parameters comprise a looping specification, wherein the looping specification specifies repeated execution of a specified subset of scan list entries.

21. The system of claim 20, wherein the looping specification provides an ability to jump to a specified scan list entry.

22. The system of claim 21, wherein the looping specification provides an ability to jump to any scan list entry and independently mark the end of the scan list.

23. A measurement system, comprising:

a digitizer, wherein the digitizer is operable to couple to an external source, wherein the digitizer is operable to store and execute a scan list to acquire analog signals from the external source, wherein the scan list comprises a data structure which specifies digitizer operations, wherein the digitizer is operable to convert the analog signals to digital signals;

wherein the scan list comprises a plurality of entries, wherein each of the plurality of entries comprises parameters specifying a data acquisition operation; and wherein the parameters comprise a looping specification, wherein the looping specification specifies repeated execution of a specified subset of scan list entries.

24. The measurement system of claim 23, wherein the looping specification provides an ability to jump to a specified scan list entry.

25. The measurement system of claim 24, wherein the looping specification provides an ability to jump to any scan list entry and independently mark the end of the scan list.

* * * * *